US010054338B2

(12) United States Patent
Army, Jr. et al.

(10) Patent No.: US 10,054,338 B2
(45) Date of Patent: Aug. 21, 2018

(54) FLEXIBLE COUPLING WITH ROTATIONAL CAPABILITY

(71) Applicant: Hamilton Sundstrand Corporation, Windsor Locks, CT (US)

(72) Inventors: Donald E. Army, Jr., Enfield, CT (US); Christopher Tokas, Springfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 574 days.

(21) Appl. No.: 14/662,934

(22) Filed: Mar. 19, 2015

(65) Prior Publication Data
US 2016/0273810 A1  Sep. 22, 2016

(51) Int. Cl.
| F16L 43/00 | (2006.01) |
| F25B 13/00 | (2006.01) |
| F16L 27/08 | (2006.01) |
| F16L 27/111 | (2006.01) |
| F16L 51/02 | (2006.01) |
| F24F 13/02 | (2006.01) |
| F16L 25/00 | (2006.01) |
| F16L 27/12 | (2006.01) |
| F25B 41/04 | (2006.01) |

(52) U.S. Cl.
CPC .......... *F25B 13/00* (2013.01); *F16L 25/0018* (2013.01); *F16L 27/08* (2013.01); *F16L 27/0845* (2013.01); *F16L 27/0861* (2013.01); *F16L 27/111* (2013.01); *F16L 27/12* (2013.01); *F16L 43/00* (2013.01); *F16L 43/008* (2013.01); *F16L 51/026* (2013.01); *F24F 13/0209* (2013.01); *F25B 41/04* (2013.01)

(58) Field of Classification Search
CPC ..... F16L 17/06; F16L 27/0861; F16L 27/037; F16L 27/0841; F16L 27/0845; F16L 27/11; F16L 27/111; F16L 43/008; F16L 43/00
USPC ................................. 285/179, 227, 228, 235
See application file for complete search history.

(56) References Cited

U.S. PATENT DOCUMENTS

| 3,596,939 | A | * | 8/1971 | Gibson | ................. F16L 13/161 |
| | | | | | 285/133.21 |
| 3,791,679 | A | * | 2/1974 | Glover | ...................... E03F 3/04 |
| | | | | | 285/132.1 |
| 4,059,293 | A | * | 11/1977 | Sipler | ...................... F16L 27/11 |
| | | | | | 285/179 |
| 4,508,370 | A | * | 4/1985 | Schroeder | ............. B29C 53/587 |
| | | | | | 138/DIG. 2 |
| 4,819,970 | A | * | 4/1989 | Umehara | ................. F16L 11/15 |
| | | | | | 138/121 |
| 5,615,481 | A | * | 4/1997 | Viegener | ................. B21D 17/02 |
| | | | | | 285/179 |

(Continued)

FOREIGN PATENT DOCUMENTS

| DE | 02008034777 A1 | 1/2010 |
| FR | 1122167 A | 9/1956 |
| WO | WO98/39112 A1 | 9/1998 |

OTHER PUBLICATIONS

Extended European Search Report for EP Application No. 16161114.0, dated Jul. 25, 2016, 9 pages.

*Primary Examiner* — Aaron M Dunwoody
(74) *Attorney, Agent, or Firm* — Kinney & Lange, P.A.

(57) ABSTRACT

A coupling includes a body with two ends and a bore. Each end section includes a rotatable connection and a convolution, and there is a bent elbow section between the end sections.

11 Claims, 3 Drawing Sheets

(56) References Cited

U.S. PATENT DOCUMENTS

| | | | |
|---|---|---|---|
| 6,227,578 B1* | 5/2001 | Fukui | F16L 11/15 285/179 |
| 6,409,223 B1* | 6/2002 | Bartholoma | F16L 3/1226 285/114 |
| 7,077,166 B2* | 7/2006 | Heo | F16L 11/111 138/109 |
| 8,091,927 B2* | 1/2012 | Scanlon | F23K 5/007 285/136.1 |
| 2004/0046386 A1* | 3/2004 | Chien | F16L 37/148 285/276 |
| 2004/0090064 A1* | 5/2004 | Rowley | F16L 13/143 285/256 |
| 2008/0054631 A1 | 3/2008 | Gosis et al. | |
| 2010/0024120 A1* | 2/2010 | Coronado | E03C 1/20 4/679 |
| 2014/0120821 A1 | 5/2014 | Vignali et al. | |
| 2015/0042086 A1* | 2/2015 | Kim | F02C 7/185 285/227 |
| 2015/0226360 A1* | 8/2015 | Souma | B29C 45/2614 285/179 |

\* cited by examiner

FLEXIBLE COUPLING WITH ROTATIONAL CAPABILITY

BACKGROUND

The present invention relates generally to couplings and, more particularly, to a coupling for an air conditioning system.

Air conditioning systems for aircraft are often comprised of many different modules. The different modules can perform different functions, and certain modules are connected to other modules in order to execute the processes necessary to regulate the environment inside of an aircraft. Such an arrangement involves fluids being transferred from one module to another, so couplings are present between the modules in order for this to occur. Because air conditioning systems can have many modules, the modules can be affixed to different portions of the aircraft's structure. There are many forces exerted upon and within the aircraft during movement on the ground and through the air, such as dynamic, aerodynamic, and thermal forces. These forces can be transmitted through the aircraft's structure, causing the structure to be displaced in various directions at different locations. Therefore, for example, if two components are affixed to the aircraft structure at different locations, then the distance and orientation between them can vary depending on the loading of the aircraft structure at a given time.

SUMMARY

According to one embodiment of the present invention, a coupling includes a body with two ends and a bore. Each end section includes a rotatable connection and a convolution, and there is a bent elbow section between the end sections.

DETAILED DESCRIPTION

Figure 1:
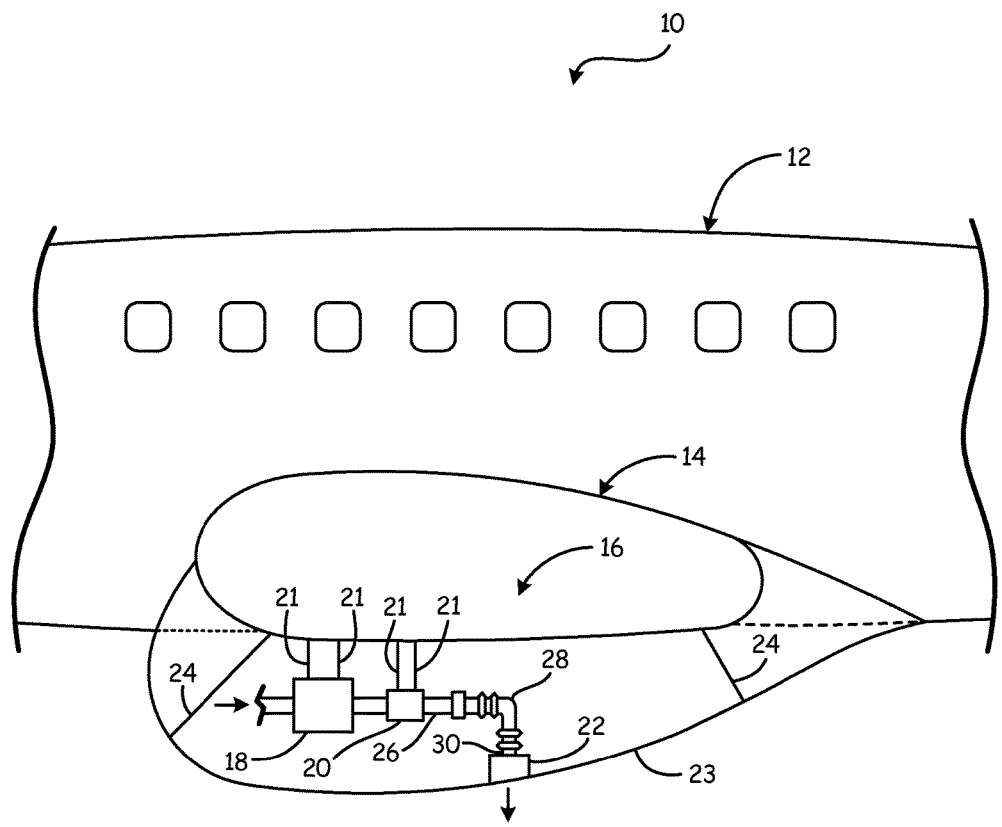
FIG. 1 is a cut-away view of an aircraft including an air conditioning system.

FIG. 1 is a cut-away view of aircraft 10. Aircraft 10 includes airframe 12, wing 14, and air conditioning system 16. Air conditioning system 16 includes compressor motor assembly 18, diverter valve 20, and overboard exhaust 22. Wing 14 is connected to airframe 12, and compressor motor 18 and diverter valve 20 are connected to wing 14 using tie rods 21. Overboard exhaust 22 is connected to body fairing 23 which is connected to airframe 12 using tie rods 24.

Compressor motor assembly 18 is fluidly connected to the atmosphere and to diverter valve 20 so that cooling air can flow past the compressor motor (not shown) inside of compressor motor assembly 18. Diverter valve 20 is fluidly connected to the primary heat exchanger fan (not shown) and to overboard exhaust 22. Diverter valve 20 is a 3-way valve that can send air from compressor motor assembly 18 to either the primary heat exchanger fan or overboard exhaust 22. Overboard exhaust 22 is also fluidly connected to the atmosphere.

In the illustrated embodiment, diverter valve 20 is fluidly connected to overboard exhaust 22 via extension 26, coupling 28, and extension 30. During operation of aircraft 10 on the ground, diverter valve 20 directs air from compressor motor assembly 18 to the primary heat exchanger fan because this fan pulls air from the atmosphere so that there is air flow through compressor motor assembly 18. During operation of aircraft 10 in flight, diverter valve 20 directs air from compressor motor assembly 18 to overboard exhaust 22. This is because the air from the atmosphere is coming in from the ram scoop (not shown) and is sufficiently pressurized to flow through compressor motor assembly 18 on its own. In the flight mode of operation, air conditioning system 16 flows fluid through coupling 28 at a pressure higher than 0 kPa (0 psi) and lower than 35 kPa (5 psi) above atmospheric pressure.

When aircraft 10 is subject to force, airframe 12, wing 14, tie rods 21, body fairing 23, and tie rods 24 will be displaced. Because diverter valve 20 is mounted to wing 14, overboard exhaust 22 is mounted to body fairing 23, and tie rods 21 and 24 include elastomeric connecting gaskets, there can be relative movement between diverter valve 20 and overboard exhaust 22 of up to 25 mm (1 in.) in any direction. This relative movement also results in an altered orientation of extension 30 with respect to extension 26. Therefore, coupling 28 is positioned between extension 26 and extension 30. As discussed below, coupling 28 is configured to be flexible and rotatable in order to maintain a fluid connection between diverter valve 20 and overboard exhaust 22 despite changes in the locations of those two components.

Figure 2A:
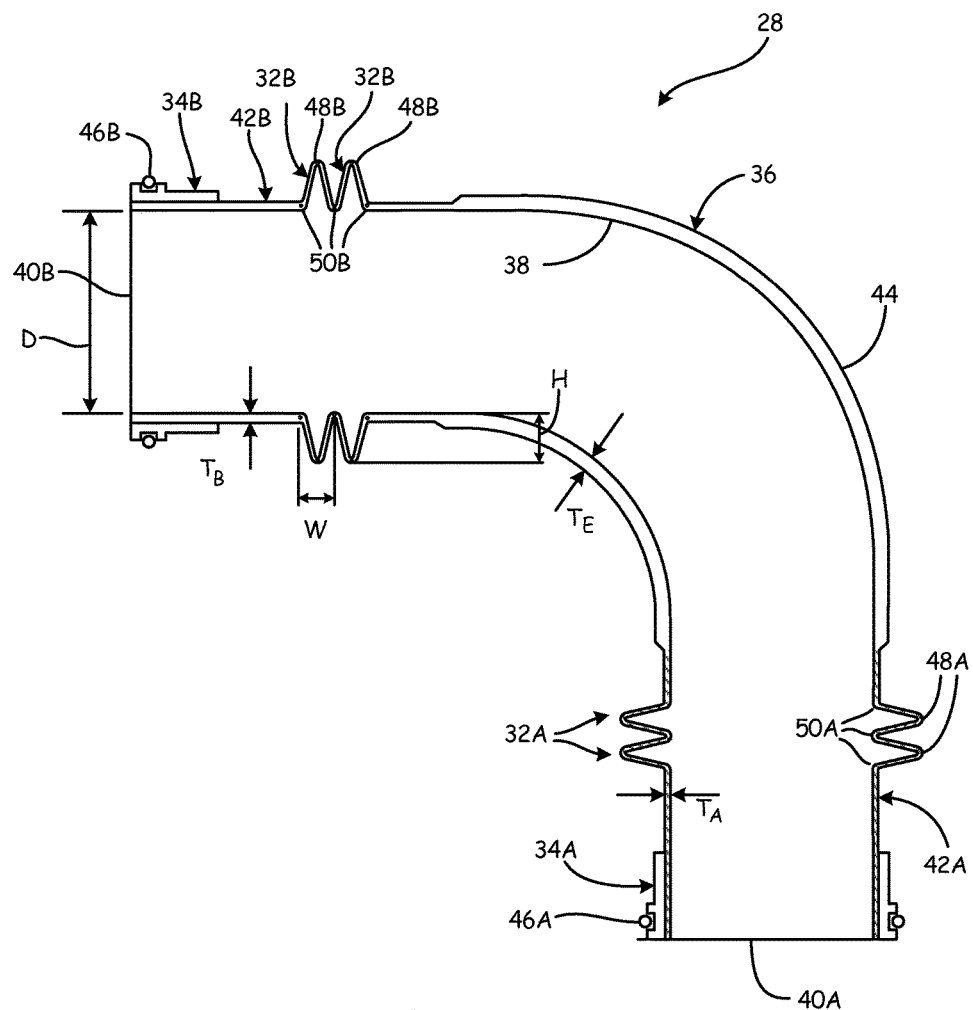
FIG. 2A is a side cross-sectional view of a coupling.
Figure 2B:
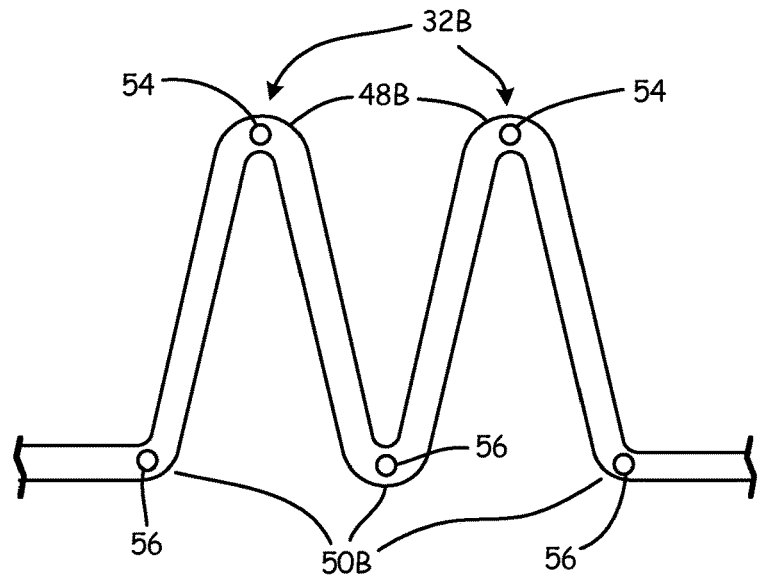
FIG. 2B is a close-up view of the coupling enclosed by circle B in FIG. 2A.
Figure 2C:
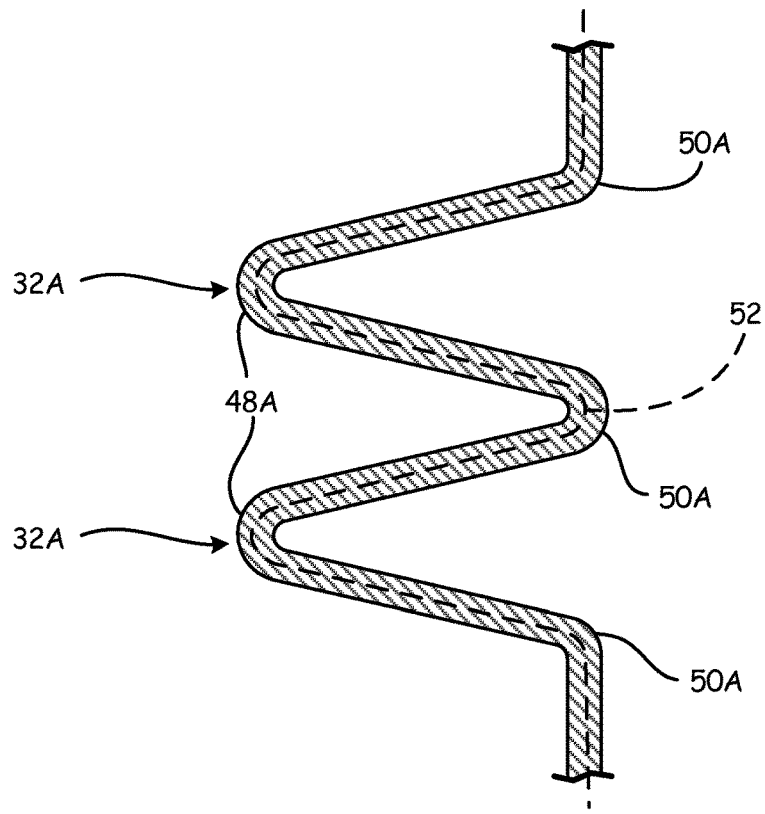
FIG. 2C is a close-up view of the coupling enclosed by circle C in FIG. 2A.

FIG. 2A is a side cross-sectional view of coupling 28, and FIGS. 2B and 2C are close-up views of coupling 28. Coupling 28 is configured to allow for the aforementioned relative movement of diverter valve 20 and overboard exhaust 22 (both shown in FIG. 1). In general, the ability to remain attached to extension 26 and extension 30 while they change positions is due to coupling 28 being comprised of an elastomeric material and having a configuration that includes convolutions 32A and 32B and rotatable connections 34A and 34B.

More specifically, in the illustrated embodiment, coupling 28 includes body 36 with bore 38 extending through body 36 from end 40A to end 40B. Body 36 has three sections including end section 42A, end section 42B, and elbow 44, with elbow 44 being positioned between end sections 42A and 42B. End sections 42A and 42B are mostly straight sections of coupling 28 that include rotatable connections 34A and 34B at ends 40A and 40B, respectively. End sections 42A and 42B also include two of convolutions 32A and 32B between rotatable connections 34A and 34B and elbow 44, respectively. Elbow 44 is a bent section of body 36 that changes the orientation of bore 38 between 45 degrees and 135 degrees, or between 60 degrees and 120 degrees, or between 75 degrees and 105 degrees, or, as shown in FIG. 2A, about 90 degrees (i.e. between 85 degrees and 95 degrees).

Rotatable connections 34A and 34B interface with extensions 26 and 30 (both shown in FIG. 1), respectively, and allow rotation of coupling 28 with respect to extension 26 and/or extension 30 while maintaining sealed connections. In the illustrated embodiment, rotatable connections 34A and 34B are designed in accordance with the Society of Automotive Engineers (SAE) AS1650 standard. Not all the components of such rotatable connections are shown in FIG. 2A, but seals 46A and 46B have been included. Seals 46A and 46B are low friction seals comprised of rubber that can be coated with polytetrafluoroethylene. SAE AS1650 standard rotatable connections allow for 360 degrees of rotation, although rotatable connections 34A and 34B may be configured to allow for only 30 degrees of rotation in some embodiments. Such embodiments are possible because the relative displacement of extension 26 to extension 30 can be restricted to eliminate the need for higher degrees of rotation of coupling 28.

As shown in FIG. 2A, each convolution 32A and 32B has a chevron-shape that includes a diverging portion proximate end 40A or 40B, respectively, and a converging portion proximate elbow 44. Peaks 48A and 48B exist at the transitions between the diverging portions and the converging portions. In addition, bases 50A and 50B exist at the transitions to and from the remainder of end sections 42A and 42B as well as between each of convolutions 32A and 32B, respectively.

The following are exemplary dimensions of coupling 28. In this example, as shown in FIGS. 2A, 2B, and 2C, all of convolutions 32A and 32B have substantially the same dimensions. Generally, elbow thickness $T_E$ is thicker than thicknesses $T_A$ and $T_B$ of end sections 42A and 42B, respectively, by about 2 times (i.e. between 1.5 and 2.5 times). More specifically, elbow thickness $T_E$ is about 2.5 mm (0.100 in.) (i.e. between 2.3 mm (0.090 in.) and 2.8 mm (0.110 in.)), and end section thicknesses $T_A$ and $T_B$ are about 1.3 mm (0.050 in.) (i.e. between 1.1 mm (0.045 in.) and 1.4 mm (0.055 in.)). Generally, the radial convolution height H from base 50B to peak 48B is smaller than bore diameter D by between 4 and 16 times. In addition, the convolution width W from one peak 48B to an adjacent peak 48B is between 1 and 2 times smaller than convolution height H. In the illustrated embodiment, bore diameter D is about 100 mm (4 in.) (i.e. between 90 mm (3.6 in.) and 110 mm (4.4 in.)). Convolution height H is about 13 mm (0.500 in.) (i.e. between 11 mm (0.450 in.) and 14 mm (0.550 in.)), and convolution width W is about 9.5 mm (0.375 in.) (i.e. between 8.6 mm (0.338 in.) and 10.5 mm (4.13 in.)). Because all convolutions 32A and 32B have substantially the same dimensions, when at rest, peaks 48A and 48B are at the same radial location with respect to bore 38. Similarly, when at rest, bases 50A and 50B are at the same radial location with respect to bore 38.

As stated previously, coupling 28 comprises an elastomeric material. More specifically, coupling 28 can comprise a silicone material with a durometer hardness of about 70 A on the Shore A scale (i.e. between 63 A and 77 A). Coupling 28 can be manufactured using a blow-molding process, and can include reinforcement material throughout and/or in select locations. Examples of such reinforcement material can include a meta-aramid fiber sheet such as sheet 52 that has been incorporated into end section 42A, as shown in FIG. 2C. Another example is in end section 42B, wherein peaks 48B and bases 50B have been reinforced with rings 54 and 56, respectively, which may comprise a meta-aramid fiber cords, as shown in FIG. 2B.

During operation of aircraft 10, extensions 26 and 30 can move relative to one another (all shown in FIG. 1). When this occurs, some or all of convolutions 32A and 32B can expand, contract, and/or shift to ensure that coupling 28 remains attached to both extensions 26 and 30. Therefore, convolution width W and/or convolution height H may change in each of convolutions 32A and 32B, and the locations or peaks 48A and 48B and/or bases 50A and 50 B can change. In addition, rotatable connections 34A and/or 34B may need to rotate relative to extensions 26 and/or 30 in order to avoid twisting coupling 28, particularly at elbow 44.

The components and configuration of coupling 28 as shown in FIGS. 1, 2A, 2B, and 2C allow for coupling 28 to expand, contract, and change orientation while maintaining fluidly sealed connections with adjacent components. Thereby, diverter valve 20 and overboard exhaust 22 (shown in FIG. 1) can remain fluidly connected to each other despite being mounted to different components (i.e. wing 14 and body fairing 23, respectively).

Depicted in FIGS. 1 and 2A-2C is one embodiment of the present invention, to which there can be alternatives. For example, coupling 28 can have greater or fewer convolutions, and the arrangement of convolutions can be asymmetric (i.e. there may be a different number of convolutions in end section 42A than in end section 42B). For another example, one or more of the convolutions can be positioned in elbow 44. For a further example, coupling 28 can comprise a polyphenylene sulfide (PPS) thermoplastic material and can be made using a suction blow molding process.

Discussion of Possible Embodiments

The following are non-exclusive descriptions of possible embodiments of the present invention.

A coupling according to an exemplary embodiment of this disclosure, among other possible things, includes: a body with a first end, a second end, and a bore extending through the body from the first end to the second end; a first end section of the body beginning at the first end of the body, the first end section comprising: a first rotatable connection; and a first convolution; a second end section of the body beginning at the second end of the body, the second end comprising: a second rotatable connection; and a second convolution; and an elbow section of the body positioned between the first end section and the second end section wherein the elbow section includes a bend; wherein the first convolution is positioned between the first rotatable connection and the elbow section and the second convolution is positioned between the second rotatable connection and the elbow section.

The coupling of the preceding paragraph can optionally include, additionally and/or alternatively, any one or more of the following features, configurations and/or additional components:

A further embodiment of the foregoing coupling, wherein a third convolution can be positioned between the elbow section and the first convolution; and a fourth convolution can be positioned between the elbow section and the second convolution.

A further embodiment of any of the foregoing couplings, wherein all of the first, second, third, and fourth convolutions can have substantially the same dimensions.

A further embodiment of any of the foregoing couplings, wherein the body at the first end section can have a first wall thickness; the body at the second end section can have a second wall thickness; and the body at the elbow section can have a third wall thickness that is between 1.5 and 2.5 times thicker than at least one of the first wall thickness and the second wall thickness.

A further embodiment of any of the foregoing couplings, wherein the first rotatable connection can be an AS1650 standard joint.

A further embodiment of any of the foregoing couplings, wherein the first rotatable connection can include a low friction seal.

A further embodiment of any of the foregoing couplings, wherein the first convolution can comprise: a diverging portion proximate the first end; a converging portion proximate the elbow section; and a peak at the transition between the diverging portion and the converging portion.

A further embodiment of any of the foregoing couplings, wherein a height of the first convolution can be between 4 and 16 times smaller than an inner diameter of the bore at the first end section, and wherein a width of the first convolution can be between 1 and 2 times smaller than the height of the first convolution.

A further embodiment of any of the foregoing couplings, wherein the first convolution can include a reinforcement ring located at the peak.

An air conditioning system according to an exemplary embodiment of this disclosure, among other possible things, includes: a compressor motor assembly including a diverter valve; an overboard exhaust; and a coupling with a bore that is fluidly connected to the diverter valve and the overboard exhaust, the coupling comprising: a first end section including a first convolution and a first rotatable connection that is rotatably connected to the diverter valve; a second end section including a second convolution and a second rotatable connection that is rotatably connected to the overboard exhaust; and an elbow section positioned between the first end section and to the second end section.

The air conditioning system of the preceding paragraph can optionally include, additionally and/or alternatively, any one or more of the following features, configurations and/or additional components:

A further embodiment of the foregoing air conditioning system, wherein the air conditioning system can be configured to flow fluid into the bore of the coupling at a pressure between 0 kPa (0 psi) and 35 kPa (5 psi) above atmospheric pressure.

A further embodiment of any of the foregoing air conditioning systems, wherein the compressor motor assembly can be mounted to a wing that is connected to an airframe; and the overboard exhaust can be mounted to a body fairing that is connected to the airframe via a tie rod.

A further embodiment of any of the foregoing air conditioning systems, wherein the coupling can comprise: a body with a first end and a second end, wherein the bore extends through the body from the first end to the second end, the body including the first end section, the second end section, and the elbow section; wherein the first convolution is positioned between the first rotatable connection and the elbow section and the second convolution is positioned between the second rotatable connection and the elbow section.

A further embodiment of any of the foregoing air conditioning systems, wherein a straight extension tube can be connected to the diverter valve and the coupling.

A further embodiment of any of the foregoing air conditioning systems, wherein the coupling can comprise: an elastomeric material; and reinforcement material molded into the elastomeric material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed:
1. A coupling comprising:
a body with a first end, a second end, and a bore extending through the body from the first end to the second end;
a first end section of the body beginning at the first end of the body, the first end section comprising:
a first rotatable connection; and
a first convolution, wherein a height of the first convolution is between 4 and 16 times smaller than an inner diameter of the bore at the first end section, wherein a width of the first convolution is between 1 and 2 times smaller than the height of the first convolution, wherein the first convolution includes a reinforcement ring located at the peak;
a second end section of the body beginning at the second end of the body, the second end comprising:
a second rotatable connection; and
a second convolution;
an elbow section of the body positioned between the first end section and the second end section wherein the elbow section includes a bend, and
wherein the first convolution comprises:
a diverging portion proximate the first end;
a converging portion proximate the elbow section; and
a peak at a transition between the diverging portion and the converging portion; and
wherein the first convolution is positioned between the first rotatable connection and the elbow section and the second convolution is positioned between the second rotatable connection and the elbow section.

2. The coupling of claim 1, further comprising:
a third convolution positioned between the elbow section and the first convolution; and
a fourth convolution positioned between the elbow section and the second convolution.

3. The coupling of claim 2, wherein all of the first, second, third, and fourth convolutions have substantially the same dimensions.

4. The coupling of claim 1, wherein:
the body at the first end section has a first wall thickness;
the body at the second end section has a second wall thickness; and
the body at the elbow section has a third wall thickness that is between 1.5 and 2.5 times thicker than at least one of the first wall thickness and the second wall thickness.

5. The coupling of claim 1, wherein the first rotatable connection includes a low friction seal.

6. An air conditioning system comprising:
a compressor motor assembly including a diverter valve;
an overboard exhaust; and
a coupling with a bore that is fluidly connected to the diverter valve and the overboard exhaust, the coupling comprising:
a body with a first end, a second end, and a bore extending through the body from the first end to the second end;
a first end section of the body beginning at the first end of the body, the first end section including a first convolution and a first rotatable connection that is rotatably connected to the diverter valve, wherein a height of the first convolution is between 4 and 16 times smaller than an inner diameter of the bore at the first end section, wherein a width of the first convolution is between 1 and 2 times smaller than the height of the first convolution, wherein the first convolution includes a reinforcement ring located at the peak;
a second end section of the body beginning at the second end of the body, the second end including a second convolution and a second rotatable connection that is rotatably connected to the overboard exhaust;

an elbow section of the body positioned between the first end section and the second end section, wherein the elbow section includes a bend, and wherein the first convolution comprises:

a diverging portion proximate the first end;

a converging portion proximate the elbow section; and a peak at a transition between the diverging portion and the converging portion; and wherein the first convolution is positioned between the first rotatable connection and the elbow section and the second convolution is positioned between the second rotatable connection and the elbow section.

7. The air conditioning system of claim 6, wherein the air conditioning system is configured to flow fluid into the bore of the coupling at a pressure between 0 kPa (0 psi) and 35 kPa (5 psi) above atmospheric pressure.

8. The air conditioning system of claim 6, wherein:

the compressor motor assembly is mounted to a wing that is connected to an airframe; and the overboard exhaust is mounted to a body fairing that is connected to the airframe via a tie rod.

9. The air conditioning system of claim 6, wherein the coupling comprises:

a body with a first end and a second end, wherein the bore extends through the body from the first end to the second end, the body including the first end section, the second end section, and the elbow section;

wherein the first convolution is positioned between the first rotatable connection and the elbow section and the second convolution is positioned between the second rotatable connection and the elbow section.

10. The air conditioning system of claim 6, and further comprising:

a straight extension tube connected to the diverter valve and the coupling.

11. The air conditioning system of claim 6, wherein the coupling comprises:

an elastomeric material; and reinforcement material molded into the elastomeric material.

* * * * *